(12) United States Patent
Yang et al.

(10) Patent No.: US 9,574,829 B2
(45) Date of Patent: Feb. 21, 2017

(54) SYSTEM FOR RECOVERING WASTE HEAT

(75) Inventors: Hojin Yang, Ulsan-si (KR); Kidon Won, Ulsan-si (KR); Juntae Kim, Ulsan-si (KR); Doojin Lee, Ulsan-si (KR); Soo Hyun Park, Ulsan-si (KR)

(73) Assignee: SKC CO., LTD., Suwon-Si (KR)

( * ) Notice: Subject to any disclaimer, the term of this patent is extended or adjusted under 35 U.S.C. 154(b) by 483 days.

(21) Appl. No.: 13/514,857

(22) PCT Filed: Nov. 30, 2010

(86) PCT No.: PCT/KR2010/008521
§ 371 (c)(1),
(2), (4) Date: Jun. 8, 2012

(87) PCT Pub. No.: WO2011/071268
PCT Pub. Date: Jun. 16, 2011

(65) Prior Publication Data
US 2012/0267076 A1    Oct. 25, 2012

(30) Foreign Application Priority Data

Dec. 11, 2009   (KR) ......................... 10-2009-0123498

(51) Int. Cl.
*F28D 15/00*   (2006.01)
*F01K 17/02*   (2006.01)
(Continued)

(52) U.S. Cl.
CPC ............. *F28D 15/00* (2013.01); *B01D 1/0058* (2013.01); *B01D 1/2856* (2013.01); *B01D 3/007* (2013.01);
(Continued)

(58) Field of Classification Search
CPC .. C21B 2100/06; C21C 2100/06; F01K 17/02;
F01K 23/064; F01K 23/06; F27D 17/005;
F27D 2017/005–2017/007; F27D 17/004;
B01D 1/0058; B01D 1/2856; B01D
1/2846; B01D 3/007; F28D 15/00; F28D
21/0003; Y02P 70/34
(Continued)

(56) References Cited

U.S. PATENT DOCUMENTS 3,259,553 A * 7/1966 Halbritter ................ B01D 1/26
159/17.2
3,261,766 A   7/1966 Sherwood
(Continued)

FOREIGN PATENT DOCUMENTS

CH      353335 A      4/1961
CN    201327047 Y    10/2009
(Continued)

OTHER PUBLICATIONS

"Specific Hear", Dec. 1, 2008, http://web.mit.edu/16.unified/www/FALL/thermodynamics/notes/node18.html.*
(Continued)

*Primary Examiner* — Steven B McAllister
*Assistant Examiner* — Steven Anderson, II
(74) *Attorney, Agent, or Firm* — Sughrue Mion, PLLC (57) ABSTRACT

Provided is a system for recovering waste heat discharged from distillation columns, incinerators, blast columns, smelting columns, and the like at relatively low temperatures to produce hot water in high efficiency, which can be used in various industrial fields. The investment and operating costs of the waste heat recovery system are relatively low as compared with the conventional systems.

3 Claims, 5 Drawing Sheets

(51) Int. Cl.
*F01K 17/06* (2006.01)
*F01K 23/06* (2006.01)
*F27D 17/00* (2006.01)
*B01D 1/00* (2006.01)
*B01D 1/28* (2006.01)
*B01D 3/00* (2006.01)
*F28D 21/00* (2006.01)

(52) U.S. Cl.
CPC ............... *F01K 17/02* (2013.01); *F01K 17/06* (2013.01); *F01K 23/064* (2013.01); *F27D 17/004* (2013.01); *C21B 2100/06* (2013.01); *C21C 2100/06* (2013.01); *F28D 21/0003* (2013.01); *Y02P 70/34* (2015.11)

(58) Field of Classification Search
USPC ...... 122/448.3, 439, 451 R, 452; 165/104.19
See application file for complete search history.

(56) References Cited

U.S. PATENT DOCUMENTS

| | | | | |
|---|---|---|---|---|
| 3,597,465 | A * | 8/1971 | Karafian et al. | 518/704 |
| 3,904,656 | A * | 9/1975 | Broz | C07D 301/32 549/538 |
| 4,160,810 | A * | 7/1979 | Benson et al. | 423/220 |
| 4,210,495 | A * | 7/1980 | Pinto | 203/22 |
| 5,035,776 | A | 7/1991 | Knapp et al. | |
| 5,386,075 | A | 1/1995 | Keil et al. | |
| 5,630,913 | A | 5/1997 | Tajer-Ardebili | |
| 5,953,936 | A * | 9/1999 | Agrawal et al. | 62/630 |
| 6,291,734 | B1 * | 9/2001 | Stork | B01D 3/141 196/111 |
| 6,776,005 | B2 | 8/2004 | Fuentes et al. | |
| 6,835,287 | B1 * | 12/2004 | Kihara et al. | 202/154 |
| 7,297,237 | B2 * | 11/2007 | Asano | B01D 3/14 202/154 |
| 2003/0140653 | A1 | 7/2003 | Fuentes et al. | |
| 2010/0224536 | A1 * | 9/2010 | Schultz et al. | 208/363 |
| 2014/0124358 | A1 * | 5/2014 | Schwint et al. | 203/50 |

FOREIGN PATENT DOCUMENTS

| | | |
|---|---|---|
| CN | 102656416 B | 6/2014 |
| EP | 0593873 A1 | 4/1994 |
| EP | 2109114 A2 | 10/2009 |
| FR | 2482979 A1 | 11/1981 |
| FR | 2855170 A1 | 11/2004 |
| GB | 776154 A | 6/1957 |
| JP | 08-028955 A | 2/1996 |
| JP | 2001-035520 A | 2/2001 |
| JP | 2007-240016 A | 9/2007 |
| JP | 2007-247932 A | 9/2007 |
| JP | 5542958 B2 | 7/2014 |
| KR | 10-2002-0066328 A | 8/2002 |
| KR | 10-2006-0090404 A | 8/2006 |
| KR | 10-0681240 B1 | 2/2007 |
| KR | 10-1172422 B1 | 8/2012 |

OTHER PUBLICATIONS

Chinese Patent Office, Chinese Office Action issued in corresponding CN Application No. 201080055927.5, dated Aug. 16, 2013.
Japanese Patent Office, Japanese Office Action issued in corresponding JP Application No. 2012-543015, dated Aug. 9, 2013.
European Patent Office, Extended European Search Report, dated Apr. 15, 2014, issued in counterpart Application No. 10836164.3.
Null, et al., "Heat Pumps in Distillation", CEP, Jul. 1976, XP001255089, pp. 58-64.
Danziger, et al., "Distillation Columns With Vapor Recompression", Chemical Engineering Progress, American Institute of Chemical Engineers, New York, NY, USA, vol. 75, No. 9, Sep. 1979, XP001272504, pp. 58-59.
Dummer, et al., "Grosstechnische Nutzung Der Thermokompression Bei Der Desteillationvon 1.2—Dichlorethan", Chem. Ing. Techn., MS/Manuskript, Weinheim, DE, No. 1914/91, Jan. 1990, XP000122660, pp. 1-21.
European Patent Office; Extended European Search Report; dated Mar. 20, 2015 issued in counterpart Application No. 14193505.6.
European Patent Office; Extended European Search Report; dated Mar. 20, 2015 issued in counterpart Application No. 14193305.1.
Meili, et al., "Heat Pumps for Distillation Columns", Chemical Engineering Progress, American Institute of Chemical Engineers, New York, USA, vol. 86, No. 6, Jun. 1990, pp. 60-65, XP 000173792.
Japanese Patent Office; Communication dated Apr. 22, 2014 in counterpart application No. 2012-543015.
State Intellectual Property Office of the P.R.C.; Communication dated Apr. 25, 2014 in counterpart application No. 201080055927.5.
Korean Intellectual Property Office; Communication dated Jul. 17, 2012 in counterpart application No. 10-2009-0123498.

* cited by examiner

SYSTEM FOR RECOVERING WASTE HEAT

CROSS REFERENCE TO RELATED APPLICATIONS

This application is a National Stage of International Application No. PCT/KR2010/008521 filed Nov. 30, 2010, claiming priority based on Korean Patent Application No. 10-2009-0123498, filed Dec. 11, 2009, the contents of all of which are incorporated herein by reference in their entirety.

FIELD OF THE INVENTION

The present invention relates to a system for recovering waste heat generated by such furnaces as distillation columns, incinerators, blast columns, and smelting columns used in various industrial fields.

BACKGROUND OF THE INVENTION

Waste heat refers to heat generated by such furnaces as distillation columns, incinerators, blast columns, and smelting columns used in various industrial fields for which no useful application is found. Waste heat produced by furnaces, boilers, dry facilities, and air conditioning facilities is often discharged in the form of combustion flue gas, whereas waste heat produced during heating, distillation, evaporation, purification, and separation processes is cooled off or condensed, and then released as cooling water. Waste heat at relatively high temperatures can be utilized for the production of low-pressure steam or for preheating boiler feed water. On the other hand, waste heat at relatively low temperatures is merely discharged to the environment due to technical difficulties as well as high equipment costs for its recovery.

Particularly, a petrochemical process may be divided into two general steps of (1) a reaction step and (2) a separation/purification step. From the perspective of energy, such a process may also be divided into (1) a heating step wherein heat is supplied, e.g., to the lower part of a column for reaction or separation/purification and (2) a cooling step wherein the upper part of a column is cooled off. In general, the heating step uses steam as a heat source, and the cooling step uses cooling water as a cooling source.

Figure 1:
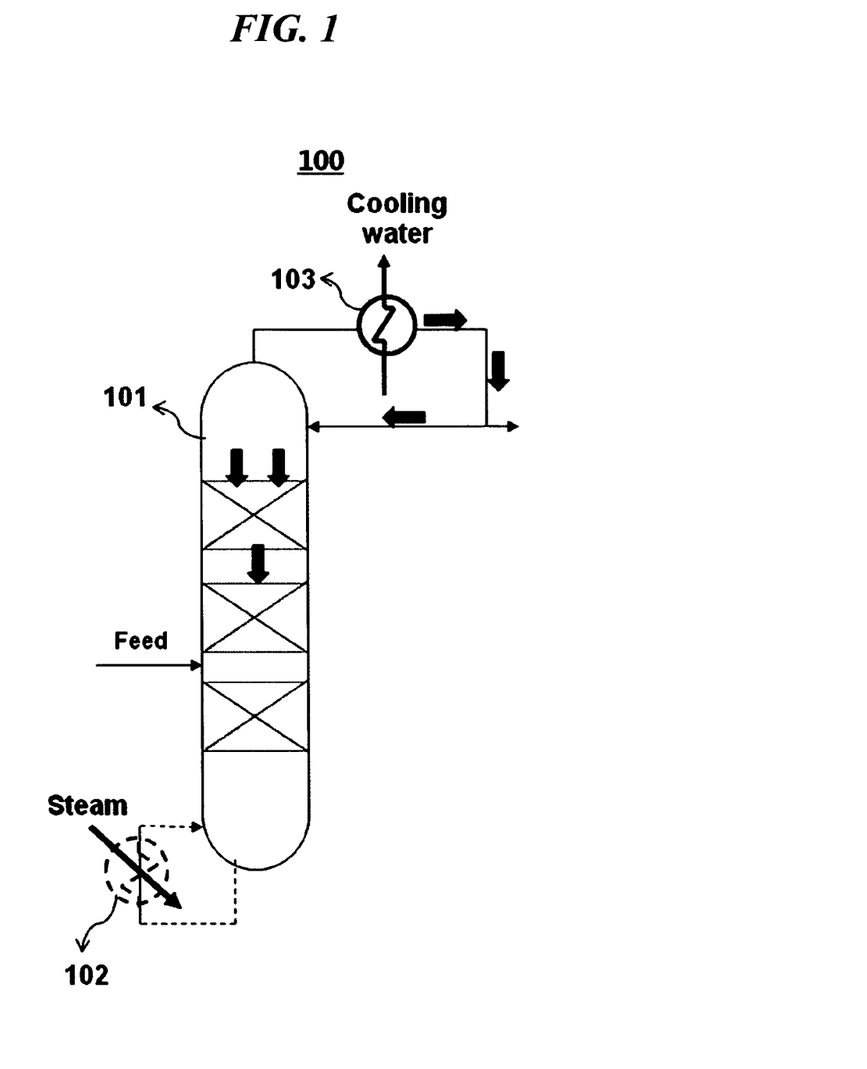
FIG. 1 is a schematic view of a conventional distillation column.

In a petrochemical process, steam is used to reboil the lower part of a column, resulting in a hot fluid. The hot fluid in the upper part of the column is subjected to cooling by cooling water or a fan cooler, which is then recycled to the column as a reflux or produce a distillate. FIG. 1 is a schematic view of a conventional distillation column wherein a hot fluid generated in the upper part of the column is cooled by cooling water. With reference to FIG. 1, the distillation column 100 comprises a column 101, a steam reboiler 102 for supplying heat to the column wherein the steam reboiler is connected to a lower part of the column, and a cooling device 103 for cooling a hot fluid discharged from an upper part of the column by cooling water wherein the cooling device is connected to the upper part of the column. The column 101 receives heat from the steam reboiler 102, and the hot fluid discharged from the upper part of the column 101 is cooled in the cooling device 103 and subsequently recycled to the column 101.

The low-temperature heat source discharged from a column overhead may be utilized by, e.g., a mechanical vapor recompressor (MVR) or a thermal vapor recompressor (TVR), instead of being cooled by cooling water.

An MVR uses a mechanical compressor for compressing vapor discharged from a column overhead to raise the temperature and the pressure thereof. The vapor can then be reused as a heat source for reboiling the column or for generating low-pressure steam. However, an MVR requires high investments and operation costs. Further, the column may not be safely operated in case the MVR system fails since no cooling source is then available.

In a TVR, high pressure vapor is used as a driving force to compress low pressure waste steam, the compressed steam being reused as a heat source. The investment and operation costs for a TVR are relatively low. However, it requires a large amount of high pressure vapor for producing usable steam, which may result in a loss of secondary steam due to the disruption of the overall steam balance.

Accordingly, there has been a need for a system for recovering waste heat generated in the upper part of a column to thereby improve the energy efficiency thereof.

SUMMARY OF THE INVENTION

Therefore, it is an object of the present invention to provide a system for recovering waste heat generated in the upper part of a column and for recycling the recovered heat to the column, to thereby improve the energy efficiency thereof.

It is another object of the present invention to provide a waste heat recovery network, a waste heat utilization network, or a multistage waste heat recovery system comprising both a waste heat recovery network and a waste heat utilization network.

In order to achieve the above-mentioned objectives, the present invention provides a system for recovering waste heat, which comprises:

a column, a steam reboiler connected to a lower part of said column for supplying heat to the column, a hot water generator connected to an upper part of said column for heating cold water to hot water by a hot fluid discharged from the upper part of the column, and a hot water reboiler connected between said hot water generator and the lower part of said column for supplying heat from said hot water to the lower part of said column, whereby the waste heat recovered from the upper part of said column is recycled to said column.

The present invention also provides a multistage system for recovering waste heat, which comprises:

a first column, a first column, a first steam reboiler connected to a lower part of said first column for supplying heat to the first column, a first hot water generator connected to an upper part of said first column for heating cold water to hot water by a hot fluid discharged from the upper part of said first column, a second column, a second steam reboiler connected to a lower part of said second column for supplying heat to the second column, a second hot water generator connected between said second column and said first hot water generator for heating said hot water to a higher temperature by a hot fluid discharged from an upper part of said second column, a third column, a third steam reboiler connected to a lower part of said third column for supplying heat to the third column, and a third hot water reboiler connected between said second hot water generator and the lower part of said third column for supplying heat from said hot water discharged from said second hot water generator to the lower part of said third column;

wherein said second column is operated at a temperature higher than the temperature at which said first column is operated.

Further, the present invention provides a multistage system for recovering waste heat, which comprises:

a first column, a first steam reboiler connected to a lower part of said first column for supplying heat to the first column, a first hot water generator connected to an upper part of said first column for heating cold water to hot water by a hot fluid discharged from the upper part of said first column, a second column, a second steam reboiler connected to a lower part of said second column for supplying heat to the second column, a second hot water reboiler connected between said first hot water generator and the lower part of said second column for supplying heat from said hot water to the lower part of said second column, a third column, a third steam reboiler connected to a lower part of said third column for supplying heat to the third column, and a third hot water reboiler connected between said second hot water reboiler and the lower part of said third column for supplying heat from the hot water discharged from said second hot water reboiler to the lower part of said third column;

wherein said second column is operated at a temperature higher than the temperature at which said third column is operated.

BRIEF DESCRIPTION OF THE DRAWINGS

The above and other objects and features of the present invention will become apparent from the following description of the invention, when taken in conjunction with the accompanying drawings, which respectively show.

DETAILED DESCRIPTION OF THE INVENTION

The present invention will be hereinafter explained in detail.

Figure 2:
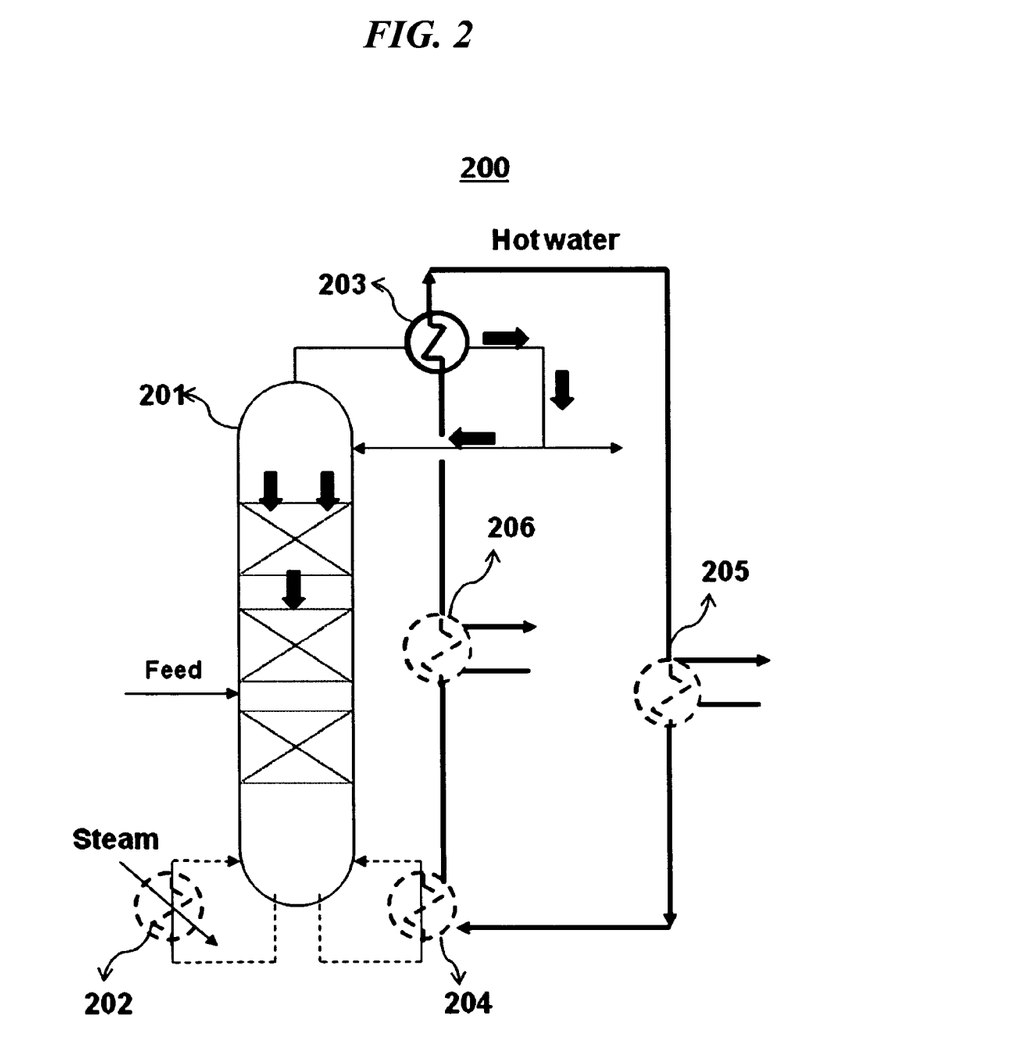
FIG. 2 is a schematic view of one embodiment of the waste heat recovery system according to the present invention.

FIG. 2 schematically illustrates a waste heat recovery system according to the present invention wherein hot water is produced by a hot fluid discharged from an upper part of a column and is supplied to a hot water reboiler.

With reference to FIG. 2, the waste heat recovery system 200 according to the present invention comprises a column 201, a steam reboiler 202 for supplying heat to the column wherein the steam reboiler is connected to a lower part of the column 201, a hot water generator 203 for heating cold water to hot water by a hot fluid discharged from an upper part of the column wherein the hot water generator is connected to the upper part of the column 201, and a hot water reboiler 204 for supplying heat from the hot water generated in the hot water generator to a lower part of the column wherein the hot water reboiler is connected to the hot water generator 203 and the lower part of the column 201.

The waste heat recovery system 200 of the present invention employs water (condensed water) as a medium for recovering low-temperature waste heat since water is readily available in a petrochemical plant and the system may be compatible with the condensed water recycling system provided in the petrochemical plant.

The waste heat recovery system 200 comprises the hot water generator 203 for heating cold water to hot water by a hot fluid discharged from the upper part of the column 201. In most petrochemical processes, the fluid discharged from the upper part of the column 201 is steam possessing latent heat, which can be used for heating cold water to hot water.

Hot water produced in the hot water generator 203 may be used for preheating fluids for use in other processes. In such case, however, it would be uneconomical since the amount of its use is limited. Therefore, the waste heat recovery system 200 of the present invention utilizes hot water produced in the hot water generator 203 for the purpose of substituting steam necessary for a column reboiler, which is one of the most energy consuming devices in conventional petrochemical processes.

The hot water reboiler 204 employed in the waste heat recovery system 200 of the present invention may be a welded plate heat exchanger.

Shell and tube heat exchangers are generally used when hot water is employed as a heating medium in place of steam. However, the heat exchange area thereof should be about five times larger, resulting in a decrease in the economic feasibility due to spatial restriction, need of structural reinforcement, increased investment costs, etc. To address the above disadvantages, the waste heat recovery system 200 of the present invention employs a welded plate heat exchanger wherein the material to be heated circulates in the vertical direction from bottom to top by natural convention (thermo-siphon) while heat is transferred from hot water to the material in the horizontal direction through the internal baffles. In a welded plate heat exchanger, the heat exchange efficiency can be improved and the installation space can be significantly reduced as compared with a conventional shell and tube heat exchanger.

The welded plate heat exchanger may be a welded plate heat exchanger wherein hot water flows in one direction along the horizontal axis, a welded plate heat exchanger wherein hot water flows back and forth along the horizontal axis, or others.

In case where the column is operated at high temperatures, an efficient heat exchange in the hot water reboiler can be accomplished by varying the operating pressure and temperature of the column. Accordingly, the waste heat recovery system 200 of the present invention may further comprise a controller (not shown) to control the operating pressure and temperature of the column.

Further, in order to efficiently operate the column 201, the waste heat recovery system 200 of the present invention may further comprise a heating device 205, as an additional heating source, for heating hot water discharged from the hot water generator 203 to a desired operating temperature of the column. The heating device 205 may be positioned between the hot water generator 203 and the hot water reboiler 204. Furthermore, the waste heat recovery system 200 of the present invention may further comprise a cooling device 206 for cooling hot water produced in the hot water reboiler 204 for preheating fluids for use in other processes. The cooling device 206 may be positioned between the hot water reboiler 204 and the hot water generator 203.

The present invention also provides a waste heat recovery network, a waste heat utilization network, and a multistage waste heat recovery system comprising both a waste heat recovery network and a waste heat utilization network.

According to one aspect of the present invention, the multistage waste heat recovery system comprises a first column, a first steam reboiler connected to a lower part of said first column for supplying heat to the first column, a first hot water generator connected to an upper part of said first column for heating cold water to hot water by a hot fluid discharged from the upper part of said first column, a second column, a second steam reboiler connected to a lower part of said second column for supplying heat to the second column, a second hot water generator connected between said second column and said first hot water generator for heating said hot water to a higher temperature by a hot fluid discharged from an upper part of said second column, a third column, a third steam reboiler connected to a lower part of said third column for supplying heat to the third column, and a third hot water reboiler connected between said second hot water generator and the lower part of said third column for supplying heat from said hot water discharged from said second hot water generator to the lower part of said third column; wherein said second column is operated at a temperature higher than the temperature at which said first column is operated.

In other words, the multistage waste heat recovery system supplies hot water produced in the first hot water generator to the second hot water generator connected to the second column, instead of recycling it to the first column, for the purpose of providing a waste heat recovery network wherein the temperature of hot water is further elevated. The multistage waste heat recovery system comprising such a waste heat recovery network is designed to circulate hot water from the first column to the second column, wherein the second column is operated at a temperature higher than the temperature at which the first column is operated, so as to further elevate the temperature of hot water.

According to another aspect of the present invention, the multistage waste heat recovery system comprises a first column, a first steam reboiler connected to a lower part of said first column for supplying heat to the first column, a first hot water generator connected to an upper part of said first column for heating cold water to hot water by a hot fluid discharged from the upper part of said first column, a second column, a second steam reboiler connected to a lower part of said second column for supplying heat to the second column, a second hot water reboiler connected between said first hot water generator and the lower part of said second column for supplying heat from said hot water to the lower part of said second column, a third column, a third steam reboiler connected to a lower part of said third column for supplying heat to the third column, and a third hot water reboiler connected between said second hot water reboiler and the lower part of said third column for supplying heat from the hot water discharged from said second hot water reboiler to the lower part of said third column; wherein said second column is operated at a temperature higher than the temperature at which said third column is operated.

In other words, the multistage waste heat recovery system supplies hot water discharged from the first hot water reboiler, after it has transferred heat to the second column, to the second hot water reboiler connected to the third column for the purpose of providing a waste heat utilization network wherein hot water having a relatively low temperature can be further utilized. The multistage waste heat recovery system comprising such a waste heat utilization network is designed to circulate hot water from the second column to the third column, wherein the second column is operated at a temperature higher than the temperature at which the third column is operated, so as to utilize hot water having a relatively low temperature.

According to an additional aspect, the multistage waste heat recovery system comprises both a waste heat recovery network and a waste heat utilization network.

Figure 3:
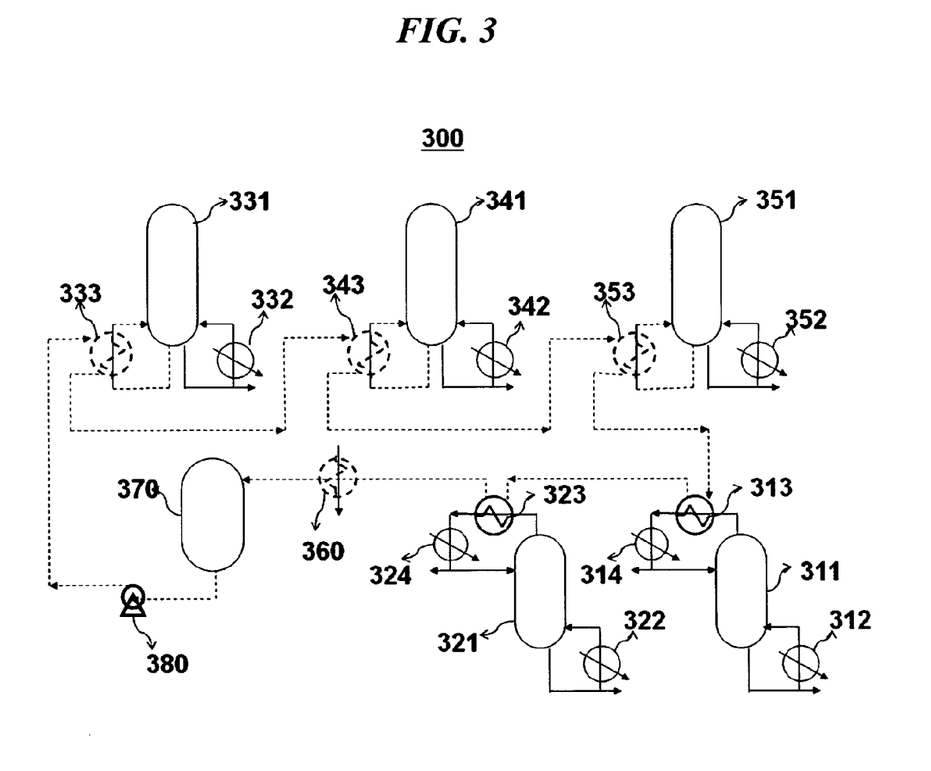
FIG. 3 is a process flow diagram of another embodiment of the multistage waste heat recovery system according to the present invention comprising a waste heat recovery network and a waste heat utilization network.

FIG. 3 illustrates a process flow of the waste heat recovery network according to the present invention comprising both a waste heat recovery network and a waste heat utilization network. With reference to FIG. 3, the multistage waste heat recovery system 300 comprises a first column 311, a first steam reboiler 312 for supplying heat to the first column wherein the first steam reboiler is connected to a lower part of the first column, a first hot water generator 313 for heating cold water to hot water by a hot fluid discharged from an upper part of the first column wherein the first hot water generator is connected to the upper part of the first column, a second column 321, a second steam reboiler 322 for supplying heat to the second column wherein the second steam reboiler is connected to a lower part of the second column, a second hot water generator 323 for heating the hot water produced in the first hot water generator to a higher temperature by a hot fluid discharged from an upper part of said second column wherein the second hot water generator is connected to the second column and the first hot water generator, a third column 331, a third steam reboiler 332 for supplying heat to the third column wherein the third steam reboiler is connected to a lower part of the third column, a first hot water reboiler 333 for supplying heat from the hot water produced in the second hot water generator to a lower part of said third column wherein the first hot water reboiler is connected to the second hot water generator and the lower part of the third column, a fourth column 341, a fourth steam reboiler 342 for supplying heat to the fourth column wherein the fourth steam reboiler is connected to a lower part of the fourth column, a second hot water reboiler 343 for supplying heat from the hot water discharged from the first hot water reboiler to a lower part of the fourth column wherein second hot water reboiler is connected to the first hot water reboiler and the lower part of said fourth column, a fifth column 351, a fifth steam reboiler 352 for supplying heat to the fifth column wherein the fifth steam reboiler is connected to a lower part of the fifth column, and a third hot water reboiler 353 for supplying heat from the hot water discharged from the second hot water reboiler to a lower part of the fifth column wherein the third hot water reboiler is connected to the second hot water reboiler and the lower part of the fifth column. The hot water discharged from the third hot water reboiler is recycled to the first hot water generator. For enhancing the efficiency of the system, the multistage waste heat recovery system may further comprise one or more of a waste recovery device 360 for recovering waste heat from waste gas generated in the process with an intermediate temperature, a storage device 370 for storing hot water collected in the waste heat recovery network, a hot water feeding device 380 for supplying hot water collected in the storage device to the waste heat utilization network, cooling devices 314, 324 in preparation for the operation of the hot water generators being halted.

With respect to the multistage waste heat recovery system, the temperatures in the waste heat recovery network is in the order of the temperature of intermediate-temperature waste gas> the operating temperature of the second column> the operating temperature of the first column; the temperatures in the waste heat utilization network is in the order of the operating temperature of the third column> the operating temperature of the fourth column> the operating temperature of the fifth column.

The waste heat recovery system 300 as illustrated in FIG. 3 comprises (a) a waste heat recovery network comprising two waste heat recovery units consisting of columns, steam reboilers and hot water generators, and (b) a waste heat utilization network comprising three waste heat utilization units consisting of columns, steam reboilers and hot water reboilers. The number of units constituting the waste heat recovery network and the waste heat utilization network can be adjusted depending on the process conditions in various industries.

The multistage waste heat recovery system can improve the energy recovery efficiency by obtaining hot water at higher temperatures through the waste heat recovery network and by utilizing hot water having relatively lower temperatures through the waste heat utilization network. In other words, the system recovers waste heat first from a column operated at a relatively low temperature and then from another column operated at a relatively high temperature so as to maximize the waste heat recovery. Similarly, the system supplies heat first to a reboiler connected to a column operated at a relatively high temperature and then to another reboiler connected to a column operated at a relatively low temperature in order to maximize the waste heat utilization.

In the multistage waste heat recovery system, each column must be operated at a constant temperature. Hence, it is preferable to supply a certain amount of heat by a hot water reboiler and to finely control the temperature of each column by a steam reboiler. In case where steam alone is used as a heat source in a reboiler, the reboiler mostly utilizes the latent heat of steam; thus, the flow rate of steam only needs to be controlled. On the other hand, in case where hot water is employed as a heat source, it is preferable to control the temperature as well as the flow rate of hot water since the reboiler utilizes the sensible heat of hot water. In other words, the amount of heat supplied from the hot water reboiler to the column can be maintained at a constant value by controlling either or both of the flow rate and the temperature of hot water supplied from the hot water generator to the hot water reboiler. In order to maintain constant supply of heat by the hot water reboiler, the waste heat recovery system according to the present invention may further comprise a controller, which measures the flow rates and the temperatures of hot water fed to and discharged from the hot water reboiler and, based on their differences, controls either or both of the flow rate and the temperature of hot water fed to the hot water reboiler.

Figure 4:
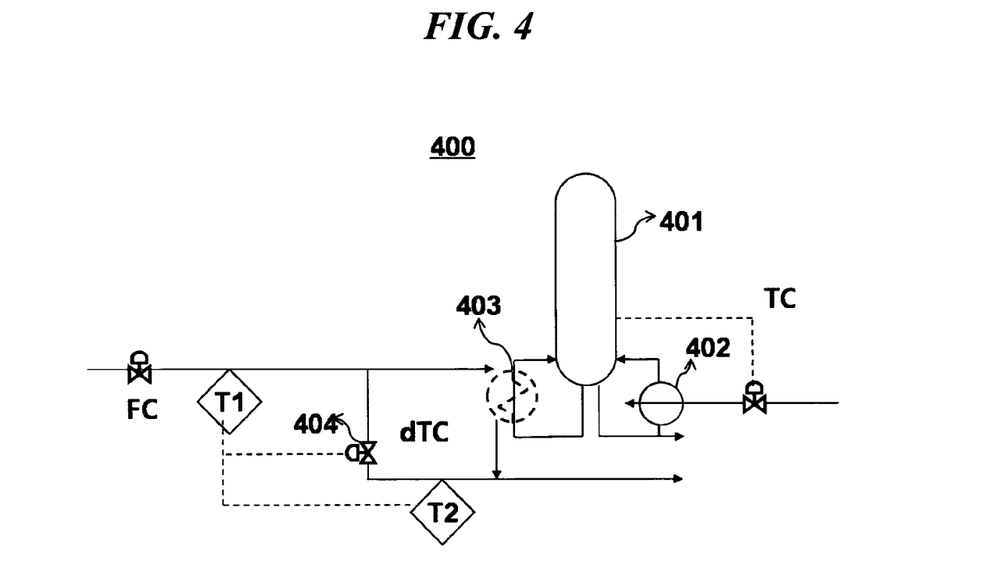
FIG. 4 is a process flow diagram of an additional embodiment of the waste heat recovery system according to the present invention comprising a controller.

FIG. 4 is a process flow diagram of the waste heat recovery system according to one embodiment of the present invention. With reference to FIG. 4, the waste heat recovery system 400 according to one embodiment of the present invention comprises a column 401, a steam reboiler 402 for supplying heat wherein the steam reboiler is connected to a lower part of the column, a hot water reboiler 403 for supplying heat from the hot water produced in a hot water generator (not shown) to a lower part of the column wherein the hot water reboiler is connected to the hot water generator and the lower part of the column, and a controller 404 that measures the flow rate and the temperature of hot water fed to and discharged from the hot water reboiler 403 and calculates their differences for controlling either or both of the flow rate and the temperature of hot water fed to the hot water reboiler 403.

Further, the controller 404 may control the flow rate by a split range control method. Especially, in case the amount of heat supplied by hot water exceeds the total amount of heat required for the operation of the column, the split range control method not only reduces the amount of heat supplied by the steam reboiler to zero, but also increases the amount of hot water bypassed for reducing the amount of heat supplied by hot water.

The waste heat recovery system of the present invention utilizes heat discharged from a distillation column, an incinerator, etc., to produce hot water and recovers heat at relatively low temperatures in high efficiency. Also, the investment and operating costs of the waste heat recovery system are relatively low as compared with the conventional systems. Therefore, it can be used in various industrial fields.

Further, the waste heat recovery rate and the waste heat utilization rate can be enhanced by combining a number of columns operated at different temperatures. In other words, as the number of columns increases in the multistage waste heat recovery system, hot water having lower temperatures can be utilized, and waste heat can be recovered from a column operated at lower temperatures since the final temperature of hot water in the waste heat utilization network decreases.

Furthermore, the waste heat recovery system of the present invention uses a welded plate heat exchanger as a heat exchanger for the hot water reboiler such that the installation space and costs thereof can be significantly reduced.

Therefore, the multistage heat exchange system has advantages of maximizing the thermal efficiency of hot water and recovering waste heat from low-temperature heat sources by lowering the temperature as much as possible.

The present invention is further described in Example; the following Example, however, is given for the purpose of illustration only, and is not intended to limit the scope of the invention.

Example

Figure 5:
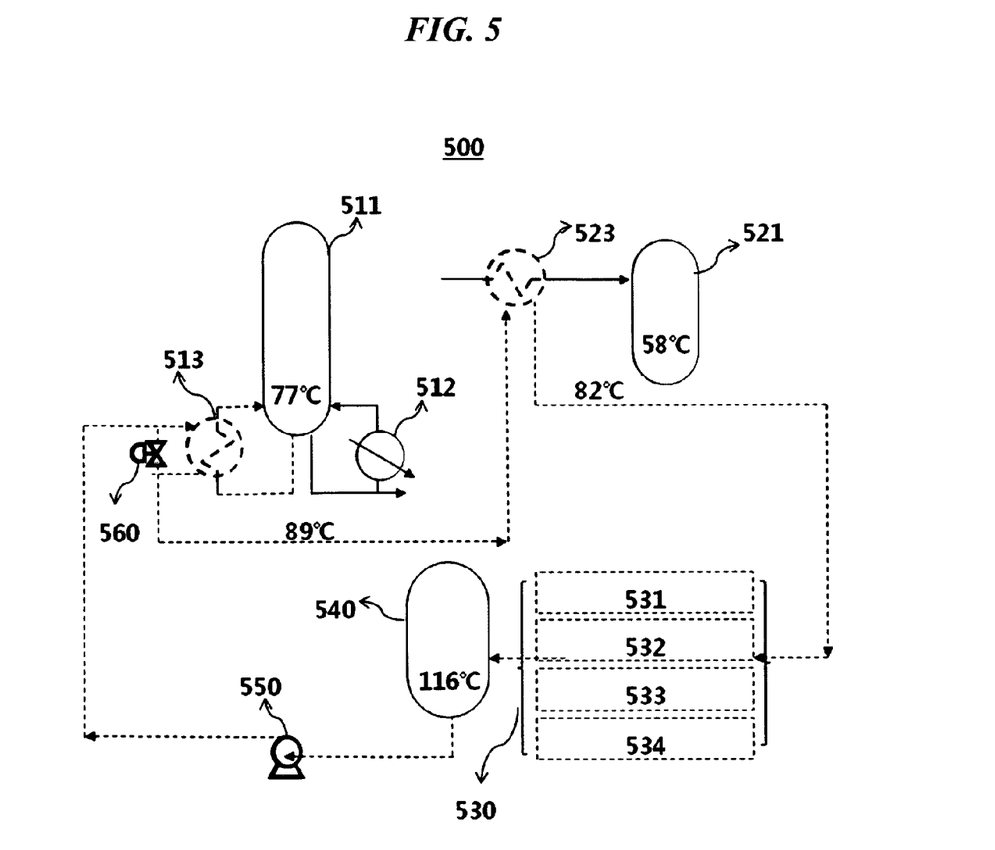
FIG. 5 is a process flow diagram of the waste heat recovery system employed in the example of the present invention.

The waste heat recovery system as illustrated in FIG. 5 was employed for recovering waste heat.

To be specific, waste heat generated from a column 531, an incinerator 532, a cooler 533, and a column 534 was recovered and supplied to a hot water generator 530 to produce hot water, which was stored in a storage device 540. The temperature of hot water sampled from the storage device 540 was 116° C. The hot water at 116° C. supplied heat to a hot water reboiler 513 of a first column 511 (operating temperature: 77° C.) via a hot water feeder 550 at a flow rate of 150 t/h. The flow rate and the temperature of the hot water fed to the hot water reboiler 513 were controlled by a controller 560. The temperature of the hot water discharged from the hot water reboiler 513, after it had transferred heat to the first column 511, was 89° C. The hot water then supplied heat to a second column 521 (operating temperature: 58° C.) by preheating the feed to the second column 521 by a hot water reboiler 523. The temperature of the hot water discharged, after it had supplied heat to the second column 521, was 82° C. The hot water discharged from the second column 521 at 82° C. was then recycled to the hot water generator 530.

In the waste heat recovery system, the amounts of steam used in the steam reboiler of the first column 511 and the second column 521 were reduced by 6 t/h and 1.5 t/h, respectively.

While some embodiments of the invention have been described by way of illustration, it will be apparent that the invention can be carried out with many modifications, variations and adaptations, and with the use of numerous equivalents or alternative solutions that are within the scope of persons skilled in the art, without departing from the spirit of the invention or exceeding the scope of the claims.

What is claimed is:

1. A multistage system for recovering waste heat, which comprises:
    a first column,
    a first steam reboiler which is fluidly connected to a lower part of said first column for supplying heat to the first column,
    a first hot water generator which is fluidly connected on a secondary side of the first hot water generator to an upper part of said first column for heating cold water to hot water on a primary side of the first hot water generator by a hot fluid discharged from the upper part of said first column,
    a second column,
    a second steam reboiler which is fluidly connected to a lower part of said second column for supplying heat to the second column,
    a first hot water reboiler which is fluidly connected on a primary side of the first hot water reboiler to said first hot water generator and on a secondary side of the first hot water reboiler to the lower part of said second column, wherein the connection between the first hot water reboiler and the second column forms a first fluid loop; and wherein the first hot water reboiler receives said hot water of temperature 1 from the first hot water generator and supplies heat from said hot water of temperature 1 to the lower part of said second column via the first fluid loop,
    a third column,
    a third steam reboiler which is fluidly connected to a lower part of said third column for supplying heat to the third column, and
    the second hot water reboiler which is fluidly connected on a primary side of the second hot water reboiler to said first hot water reboiler and on a secondary side of the second hot water reboiler to the lower part of said third column, wherein the connection between the first hot water reboiler and the second column forms a second fluid loop; wherein the second hot water reboiler receives said hot water of temperature 2 discharged from said first hot water reboiler after heat is supplied to the second column; and wherein the second hot water reboiler supplies heat from said hot water of temperature 2 to the lower part of said third column via the second fluid loop;
    wherein said second column is operated at a temperature higher than the temperature at which said third column is operated; and
    wherein the primary side of the hot water generator, the primary side of the first hot water reboiler, and the primary side of the second hot water reboiler are fluidly connected in a third fluid loop.

2. The multistage system of claim 1 further comprising a controller for controlling either or both of the flow rate and the temperatures 1 and 2 of the hot water fed to said first and second hot water reboilers based on the differences in the flow rates and the temperatures 1 and 2 of the hot water fed to and discharged from said first and second hot water reboilers.

3. The multistage system of claim 1, wherein said first and second hot water reboilers are welded plate heat exchangers.

* * * * *